United States Patent [19]

Nakane et al.

[11] 4,453,420
[45] Jun. 12, 1984

[54] TORQUE SENSOR ASSEMBLY

[75] Inventors: Takeshi Nakane, Okazaki; Kaneo Mohri, Fukuoka, both of Japan

[73] Assignee: Aisin Seiki Kabushiki Kaisha, Kariya, Japan

[21] Appl. No.: 364,236

[22] Filed: Apr. 1, 1982

[30] Foreign Application Priority Data

Apr. 14, 1981 [JP] Japan .................. 56-055807

[51] Int. Cl.³ ............................................. G01L 3/10
[52] U.S. Cl. ............................................. 73/862.34
[58] Field of Search ...................... 73/862.34; 324/174

[56] References Cited

U.S. PATENT DOCUMENTS

| 3,170,323 | 2/1965 | Kuhrt et al. | 73/862.34 |
| 3,589,178 | 6/1971 | Germann | 73/862.34 |
| 4,364,011 | 12/1982 | Bloomfield et al. | 324/174 |

FOREIGN PATENT DOCUMENTS

| 1972720 | 11/1967 | Fed. Rep. of Germany . | |
| 52-42170 | 4/1977 | Japan | 73/862.34 |

OTHER PUBLICATIONS

Wiegand Effect: A New Pulse-Generating Option, Automotive Engineering, Feb. 1978, pp. 44-48.

Primary Examiner—Charles A. Ruehl
Attorney, Agent, or Firm—Oblon, Fisher, Spivak, McClelland & Maier

[57] ABSTRACT

A torque sensor assembly comprises at least a pair of permanent magnets axially spaced at a predetermined distance and integrally fixed to a driving shaft, and at least a pair of Wiegand Effect elements arranged in magnetic coupling relationship with the respective magnets for detecting a phase difference between pulses occuring in each pickup coil of the Wiegand Effect elements during rotation of the shaft.

5 Claims, 7 Drawing Figures

U.S. Patent   Jun. 12, 1984   Sheet 1 of 2   4,453,420
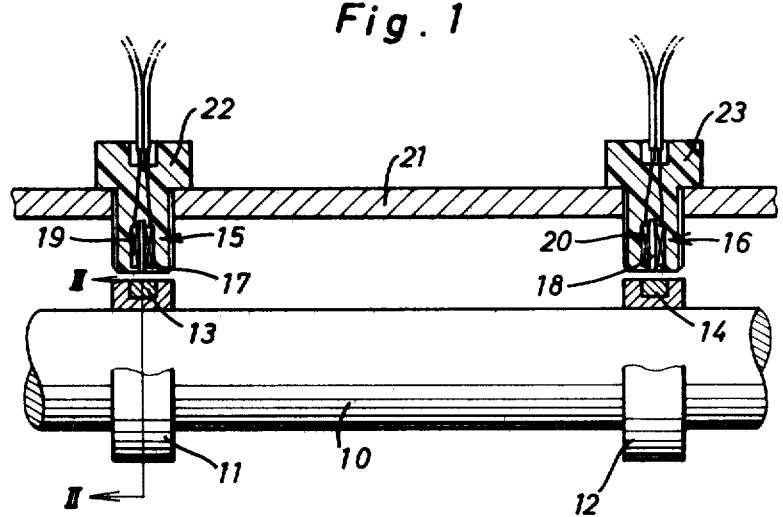
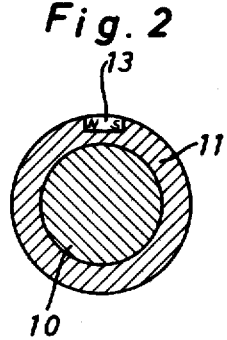
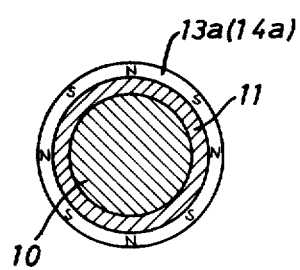

TORQUE SENSOR ASSEMBLY

BACKGROUND OF THE INVENTION

The present invention relates to a torque sensor for detecting the rotational torque of such a driving shaft as an output shaft of a power transmission for automotive vehicles.

In conventional torque sensors of this kind, a pair of magnetic pickup transducers are arranged in magnetic coupling relationship with a pair of gears which are axially spaced at a predetermined distance and fixed to a driving shaft. Each of the magnetic pickup transducers generates pulses therefrom at a frequency proportional to the rotational speed of the driving shaft. Thus, the rotational torque of the shaft is detected by a phase difference between pulses from the respective transducers. In operation of such magnetic pickup transducers, the frequency of the pulses decreases in accordance with decrease of the rotational speed of the driving shaft, resulting in decrease of impedance in the transducers. As a result, the amplitude of the sensed pulses becomes small during rotation of the driving shaft at a low speed. For this reason, it is difficult to discriminate the sensed pulses from noises. This means that the rotational torque of the driving shaft may not be accurately detected in its operation at a low speed.

SUMMARY OF THE INVENTION

It is, therefore, the primary object of the present invention to provide a torque sensor assembly which is capable of accurately detecting the rotational torque of a driving shaft irrespectively of change of the shaft speed.

In a preferred embodiment of the present invention, the primary object is accomplished by provision of a torque sensor assembly which comprises at least a pair of permanent magnets axially spaced at a predetermined distance and fixed to a driving shaft, and at least a pair of Wiegand Effect elements arranged in magnetic coupling relationship with the respective magnets for detecting a phase difference between pulses occuring in the respective Wiegand Effect elements during rotation of the shaft. Each of the Wiegand Effect elements consists of a short piece of Wiegand wire with a pickup coil wound around it to generate differing magnetic permeability of its inner core and outer shell. When subjected to each cyclic magnetic field of the magnets, sharply defined pulses occur in each pickup coil of the Wiegand Effect elements essentially independent of the rotational speed of the shaft. The sharply defined pulses serve to accurately detect a phase difference between the pulses so as to ensure accurate detection of the rotational torque of the shaft in its operation at a low speed.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is an elevational view partially in section of a torque sensor assembly according to the present invention adapted to an output shaft of a power transmission;

FIG. 2 is a cross-sectional view taken along the plane of II—II in FIG. 1;

FIG. 7 is a cross-sectional view of a modification of the torque sensor assembly shown in FIG. 1.

DESCRIPTION OF THE PREFERRED EMBODIMENTS

Figure 3:
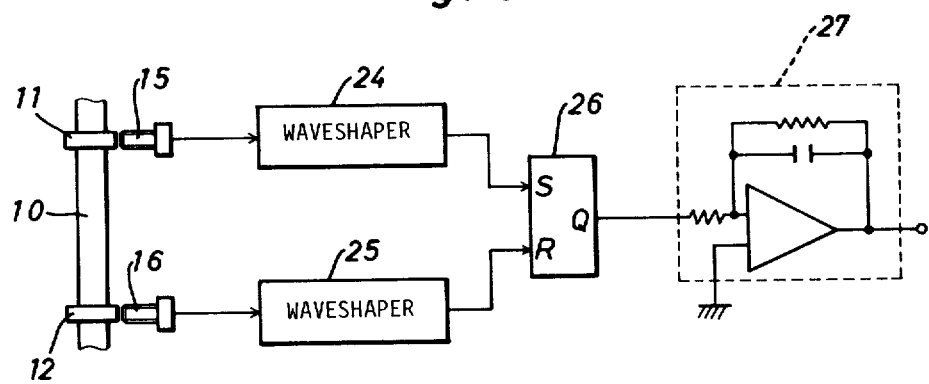
FIG. 3 is a block diagram of an electric detecting circuit coupled with the torque sensor of FIG. 1.

Referring now to the drawings, particularly in FIG. 1 there is illustrated a driving shaft 10 in the form of an output shaft of a power transmission which is rotatably supported from a transmission housing 21. The driving shaft 10 is provided with a pair of non-magnetic ring members 11 and 12 which are axially spaced at a predetermined distance and integrally fixed to the shaft 10. Embedded within the ring members 11 and 12 are respectively permanent magnets 13 and 14 of which north and south poles N and S are arranged at the same position in a circumferential direction, as shown in FIG. 2. A pair of Wiegand Effect elements 15 and 16 are fixedly mounted on the transmission housing 21 and arranged in magnetic coupling relationship with the respective magnets 13 and 14. The Wiegand Effect element 15 consists of a short piece of Wiegand wire 17 and a pickup coil 19 wound around it, and also the Wiegand Effect element 16 consists of a short piece of Wiegand wire 18 with a pickup coil 20 wound around it. The Wiegand Effect elements 15 and 16 are respectively embedded within plastic plugs 22 and 23 which are threaded into the transmission housing 21 to position the respective Wiegand Effect elements 15 and 16 in place.

In fabrication of the Wiegand wire pieces 17, 18, a special work-hardening of such a homogenous alloy as an iron-nickel alloy leaves an outer shell needing much higher applied magnetic field to change its porality than that required for the inner core. Alternatively, an amorphous alloy with large magnetic strain is treated in the form of a coil at an annealing process to form an inner core at its inner periphery and an outer shell at its outer periphery, and the annealing processed alloy is flattened. Each of such Wiegand wire pieces 17 and 18 generates differing magnetic permeability of its inner core and outer shell. When subjected to each cyclic magnetic field of the magnets 13 and 14, sharply defined voltage pulses occur in each pickup coil of the Wiegand Effect elements 15 and 16 independent of the rotational speed of the shaft 10.

Figure 4:
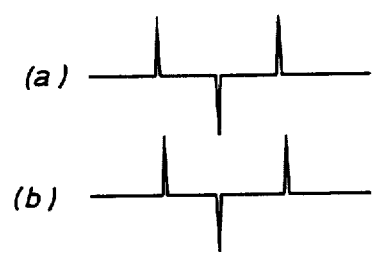
FIG. 4 illustrates pulses occuring in each Wiegand Effect element of the torque sensor assembly shown in FIG. 1.

During rotation of the shaft 10, a large positive sharply defined pulse occurs in each pickup coil of the elements 15 and 16 when the inner core reverses porality with respect to its outer shell due to approach of the magnetic field of each south pole S of magnets 13 and 14 after excitation by the magnetic field of each north pole N of the magnets, as shown in FIG. 4, (a) and (b). A small positive pulse (not shown) occurs when the porality of the inner core switches back to that of the outer shell due to further approach of the magnetic field of each south pole S of magnets 13 and 14, provided that the small positive pulses may not be used for torque detection. Sequentially, a large negative sharply defined pulse occurs when the inner core reverses porality with respect to its outer shell due to approach of the magnetic field of each north pole N of magnets 13 and 14, provided that the large negative pulses may not be used for torque detection. A small negative pulse is further generated when the porality of the inner core switches back to that of the outer shell due to further approach of the magnetic field of each north pole N, provided that the small negative pulses may not be used for torque detection.

Figure 5:
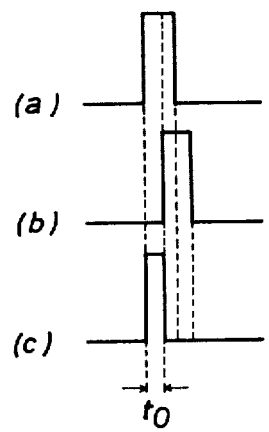
FIG. 5 illustrates waveforms reshaped by each waveshaper in the detecting circuit of FIG. 3.
Figure 6:
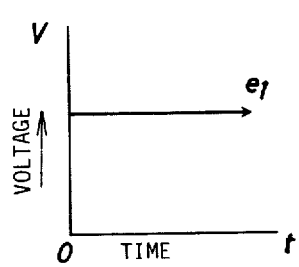
FIG. 6 is a graph showing an output of an integration circuit in the detecting circuit.

FIG. 3 illustrates an electric detecting circuit which acts to detect a phase difference between the large positive sharply defined pulses occuring in each pickup coil of the Wiegand Effect elements 15 and 16 thereby to detect the rotational torque of the shaft 10. In the electric detecting circuit, the positive pulse occuring in the first Wiegand Effect element 15 is reshaped in a rectangular wave by a first waveshaper 24, as shown in FIG. 5, (a), while the positive pulse occuring in the second Wiegand Effect element 16 is also reshaped in a rectangular wave by a second waveshaper 25, as shown in FIG. 5, (b). When the first and second rectangular waves from waveshapers 24, 25 are applied to a flip-flop circuit 26 as set and reset signals, an output rectangular wave is defined by the leading edges of the first and second rectangular waves and appears at an output terminal Q of flip-flop circuit 26, as shown in FIG. 5, (c). Thus, a phase difference between the positive pulses occuring in the respective Wiegand Effect elements 15 and 16 is detected by the width $t_0$ of the output rectangular wave. Finally, the rotational torque of the shaft 10 is detected as an analog value $e_1$ which is obtained by integration of the output rectangular wave in an integration circuit 27, as shown in FIG. 6.

In the actual practices of the present invention, a plurality of permanent magnets 13a (14a) may be formed or embedded within each of the ring members 11, 12, as shown in FIG. 7. In the case that the driving shaft is made of non-magnetic material, the above-described magnets may be directly fixed to the shaft. It is also noted that the north and south poles N and S of the magnet 14 may be arranged in a circumferentially different position in relation to those of the magnet 13.

Having now fully set forth structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A torque sensor for detecting the rotational torque transmitted by a shaft, comprising:
    at least a pair of permanent magnets axially spaced at a predetermined distance and integrally fixed to said shaft;
    a pair of pickup coils arranged in magnetic coupling relationship with each of said permanent magnets and adapted to detect a phase difference occurring between output signals of said pickup coils as a measurement for a transmitted torque, each of said pickup coils having a core formed by a short piece of Wiegand wire;
    a pair of waveshapers arranged to reshape positive pulses respectively occurring in said pickup coils to corresponding rectangular wave signals;
    a flip-flop circuit having applied thereto the rectangular wave signals as set and reset signals to produce an output rectangular wave signal defined by the leading edges of the rectangular wave signals from said waveshapers; and
    an integration circuit to detect the transmitted torque in dependence upon the width of the output rectangular wave signal from said flip-flop circuit.

2. A torque sensor as claimed in claim 1, wherein said permanent magnets are respectively embedded within a pair of ring members of non-magnetic material which are axially spaced at a predetermined distance and integrally fixed to said shaft.

3. A torque sensor as claimed in claim 2, comprising:
    a plurality of permanent magnets circumferentially provided within each of said ring members and arranged in magnetic coupling relationship with said each of said pickup coils and Wiegand wires.

4. A torque sensor as claimed in claim 1, wherein the north and south poles of each of said permanent magnets are arranged at the same position in a circumferential direction and aligned on a common axis.

5. A torque sensor as claimed in claim 1, wherein said shaft is an output shaft of a power transmission rotatably supported from a transmission housing, and each of said pickup coils and said Wiegand wires is mounted on said housing in a radial direction to be in magnetic coupling relationship with said respective permanent magnets.

* * * * *